June 8, 1948.  J. M. TYRNER  2,442,832
STARTING DEVICE FOR ARC WELDING MACHINES
Filed March 20, 1945

INVENTOR
JOSEPH M. TYRNER
BY
ATTORNEYS

Patented June 8, 1948

2,442,832

UNITED STATES PATENT OFFICE 2,442,832

STARTING DEVICE FOR ARC WELDING MACHINES

Joseph M. Tyrner, New York, N. Y., assignor to Air Reduction Company, Incorporated, a corporation of New York Application March 20, 1945, Serial No. 583,757

5 Claims. (Cl. 314—66)

1

This invention relates to improvements in devices for striking an arc between the electrode and the work in an arc welding operation such as carried out by an automatic welding machine. More particularly the invention relates to a magnetic device and to a magnetic latch starter device for automatic welding machines.

The automatic head of an automatic welding machine is conventionally operated to strike an arc between the electrode and the work by reversing the motor which drives the feed mechanism. The reversal is commonly initiated by a control apparatus which in turn is governed by the voltage of the arc. In the case of such an apparatus, it is apparent that the fastest response of the control apparatus cannot result in fast action at the arc because the masses of the drive mechanism must be stopped and accelerated in the opposite direction in order to produce a reversal of the feed mechanism. An investigation of the phenomena involved in the striking of welding arcs revealed the fact that the electrode and the work piece should not be in contact any longer than from about 40 to about 70 milliseconds, if conventional electric current supplies are employed. Longer contact times result in the "freezing" of the electrode to the work. This freezing occurs with sufficient frequency with commercial automatic welders that the work piece must usually be clamped down so that the force of the drive may be used to break the electrode loose from the work. These difficulties are avoided by the use of the apparatus of the present invention.

Other difficulties involved in arc welding occur in connection with the conventional manner of starting an automatic head for submerged arc welding, which is accomplished by placing a piece of steel wool between the work and the electrode. As soon as the current is turned on, the steel wool melts away and ignites the arc. While this procedure may appear to be very simple, it is, nevertheless decidedly inconvenient for the operator, who has to work in an awkward position while trying to place the steel wool, and at the same time advance the electrode down until it touches the wool. The automatic device of the present invention is adapted to overcome these disadvantages.

Accordingly, the primary object of the invention is to provide an improved automatic starter device of simplified construction for automatically striking the arc between a welding electrode and the work to be welded.

Another object of the invention is to provide

2 an improved starter device including a latch means which is adapted to be tripped by the flow of welding current and thereby initiate the welding arc between the electrode and the work to be welded.

A further object of the invention is to provide an automatic arc weld starter of simplified construction for establishing a welding arc.

Figure 1:
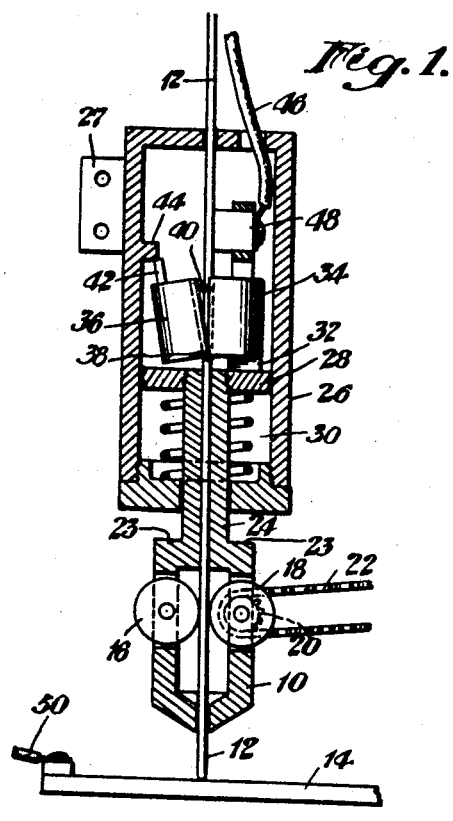
Fig. 1 is a vertical view partly in section of an improved starting device for automatic welding heads constructed in accordance with the features of the invention.

Referring to Fig. 1 of the drawings, the improved starting device for automatic heads shown therein comprises a movable support 10 through which an electrode 12 is moved for welding a work piece 14. The movable support 10 includes a pair of feed rollers 16 and 18, the latter of which is attached to a sprocket 20 driven by a chain belt 22 extending to a motor, not shown. Other types of driving means may be employed but the sprocket and chain connection to the driving motor permits the vertical movement of the support 10.

The upper portion of the movable support 10 comprises a limiting shoulder 23 and a projecting hollow shaft 24 which extends centrally through the lower head of a cylindrical housing 26 which may be attached to an automatic welding machine by any suitable means such as a lug 27. The end of the shaft 24 is threaded into a guide plate or head 28 which operates along the inside wall of the housing 26. A spring 30 is mounted under the plate 28 and normally biases the support 10 in an upward direction. The welding rod or wire 12 extends through the shaft 24 and the housing 26, as indicated. The magnetic latch device of the present invention is mounted on the plate or head 28 by an attached spacer block 32, the device comprising a pair of iron core members 34 and 36, the former of which is mounted in fixed position on the block 32 and the latter of which is attached to the member 34 by a hinge 38.

The iron core members 34 and 36, when in closed position, form a substantially symmetrical iron cylinder having a central bore through which the electrode 12 moves freely. The core member 36 normally pivots away from the member 34 when no current is flowing, and this movement may be biased by means of a small spring or springs 40 mounted between the upper portion of the core members 34 and 36. The movement of the member 36 is limited by its engagement with plate 28. A latch pin 42 is attached to the top of the core member 36 and engages a lug 44 when the support is pulled down with respect to the housing 26. The core member 36 and pin 42 therefore become a latch which retains the support 10 in its extended position.

Welding current may be supplied to the welding rod 12, which is a current conductor, by any suitable means, as, for example, by a supply conductor 46 which is connected to a contact brush 48 fixed to the top of the core member 34 by means of a mounting bracket, as shown. The source of welding current is also connected to the work piece 14 by means of a conductor 50.

The apparatus shown in Fig. 1 is set with the latch in position to prevent the upward movement of the support 10. When the automatic welding apparatus, of which the starter head of the present invention is a part, is operated to carry out a welding operation, the feed mechanism moves the welding electrode 12 downward until it makes contact with the work 14. The in-rush of welding current through the welding rod or current conductor 12 creates a magnetic field in the core members 34 and 36, causing the member 36 to move up in contact with the member 34, thereby releasing the latch and permitting the upward movement of the support 10, the feed rollers 16 and 18, the electrode 12, and the brush 48. This movement is caused almost instantly by the action of the spring 30. The electrode 12 is therefore retracted from the work in spite of the feeding mechanism, and the arc is ignited. The extent of the upward movement of the support 10 with respect to the housing 26 is governed by the length of the pin 42 in relation to the position of the limiting shoulder 23 of the support 10 which engages the bottom of the housing 26.

Before starting a welding operation with the apparatus as shown in Fig. 1, the support 10 must be pulled out so that the latch is set, which is the position shown in Fig. 1. This is done by moving the support 10 down until the latch pin 42 is engaged under the lug 44.

Figure 2:
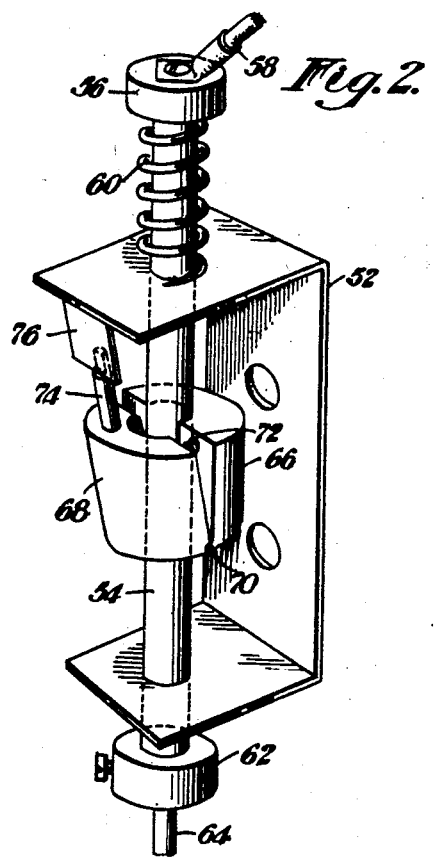
Fig. 2 is a perspective view of a modified form of starting device, with parts broken away or removed.

The device shown in Fig. 2 comprises a bracket 52 provided with side holes for mounting the device in a housing or on a suitable part of the automatic welding machine such as on the feed mechanism. The same type of latch principle is employed in the device of Fig. 2 as that in the device of Fig. 1. The bracket 52 includes bent-in end right angle flanges provided with aligned holes through which a movable electrode supporting rod 54 extends. The top of the rod is provided with a cap 56 and an attached welding current lead 58. The rod 54, which is a current conductor, is biased to move upwardly by means of a spring 60 mounted between the cap 56 and the bracket. The opposite end of the conductor rod 54 has an attached electrode mount 62 which is bored centrally to receive an electrode 64 held in place by means of a thumb screw, as shown. The mount 62 is positioned on the rod 54 at a predetermined distance from the bracket 52 so that the upward movement of the rod is limited to a distance equal to the correct arc length.

The magnetic latch or trip mechanism similar to that shown in Fig. 1 is attached to the rod 54 within the bracket 52 and comprises iron core members 66 and 68, the former being attached in fixed position to the rod 54 while the two members are hinged together at 70. A spring 72 urges the core members apart, and the member 68 is provided with a shouldered pin 74, the shoulder of which engages the lower edge of a rest or plate 76 extending from the upper portion of the bracket 52. The upper part of the pin 74 limits the outward movement of the member 68. The split iron core comprising the members 66 and 68 is preferably in the form of a cylinder having a central bore which approximately fits the rod 54. In the forms of the apparatus shown in Figs. 1 and 2, the portion of the bore in the members 36 and 68 should be beveled out slightly at the bottom to permit pivoting of these members.

The automatic device shown in Fig. 2 operates in a manner similar to that of Fig. 1 so that prior to starting a welding operation, the rod is pulled down until the shoulder on the pin 74 engages the plate 76. As soon as the electrode 64 touches the work piece to be welded, the passage of a heavy welding current through the rod 54 magnetizes the core members 66 and 68, thereby pulling the upper part of the core 68 in against the member 66 and releasing the rod 54 which jumps upward to draw the proper arc for the electrode. Instead of using springs 40 and 72 in the devices of Figs. 1 and 2, the force of gravity may be relied upon to cause the core members 36 and 68 to fall into locking position.

What is claimed as new is:

1. In an automatic welding machine including a movable welding electrode support having means for feeding an electrode toward the work to be welded, means for automatically striking an arc between a welding electrode and the work including means for normally biasing said support in a direction away from the work, a welding current conductor at least the lower portion of which comprises a welding electrode, an iron core surrounding said conductor and operatively connected to said movable support, said core having a pivoted section adapted to move toward and away from said conductor, means for latching said pivoted section when said support is in its extended position, said pivoted section being adapted to be pulled into place adjacent said conductor and thereby release said support for rapid movement of said welding electrode away from the work when welding current flows through said conductor.

2. In an automatic arc welding apparatus, a device for automatically establishing an arc between a welding electrode and the work to be welded, comprising a conductor for supplying welding current for the welding operation, a movable electrode holder mounted on a welding head, means for normally biasing said holder away from the work, latching means for retaining said holder in extended position with respect to said head against the action of said biasing means, said latching means including an iron core operatively connected to said movable holder and surrounding said conductor, said core including a pivoted section adapted to pivot toward and away from said conductor for operating said latch, said pivoted section being adapted to be pulled in toward said conductor upon the passage of welding current through the conductor, thereby releasing the latch and permitting said biasing means to retract the electrode from the work to be welded.

3. In an automatic arc welding machine, a device for automatically establishing an arc between a welding electrode and the work to be welded, comprising a conductor for the passage of a heavy electric current, a split iron core surrounding said conductor, one section of said core being operatively connected to the eletrode and movable therewith, the other section of said core being pivoted for lateral movement toward and away from the conductor and the core section connected to the electrode, means for latching said movable core section to hold the electrode in extended position, said movable core section being adapted to be pulled in toward the conductor upon the passage of a heavy current therethrough and thereby unlatching said movable core section, and means for retracting the electrode to a predetermined extent when said movable core member is unlatched.

4. In an automatic arc welding machine, a device for automatically establishing an arc between a welding electrode and the work to be welded, comprising a conductor for supplying welding current for the welding operation, a movable electrode support mounted in a welding head, means for normally biasing said support away from work, latching means for holding said support in extended position with respect to said head against the action of said biasing means, said latching means including a split iron core surrounding said conductor one section of which is connected to said movable support, the other section of said core being pivotally mounted for movement toward and away from said conductor and the core section connected to said support, a pin on said pivoted core section adapted to engage a retaining member on said head when said support is in extended position, said pivoted core section being adapted to be pulled in toward said conductor upon the passage of a welding current therethrough, thereby releasing said pin and permitting said biasing means to retract the electrode from the work to be welded.

5. In an automatic welding head, a conductor for the passage of welding current to a welding electrode, a movable electrode holder, retracting means adapted to move the electrode and electrode holder away from the work to be welded to establish a welding arc upon the passage of welding current through said conductor, a split cylindrical iron core surrounding said conductor, one section of which is mounted in fixed relation to the axis of the conductor and the other section of the core being pivotally mounted with respect to said fixed section and movable toward and away from the conductor, said pivoted core section being adapted to be moved toward the conductor and the fixed core section upon the passage of welding current through the conductor, and means adapted when said pivoted core section is in a position away from the conductor to restrain said retracting means from moving the electrode holder and electrode away from the work but functioning when the pivoted core member is moved toward the conductor by the passage of welding current to render the retracting means effective to move the electrode holder and electrode away from the work.

JOSEPH M. TYRNER.

REFERENCES CITED

The following references are of record in the file of this patent:

UNITED STATES PATENTS

| Number | Name | Date |
|---|---|---|
| 1,220,813 | Barrow | Mar. 27, 1917 |
| 1,930,290 | Stresau | Oct. 10, 1933 |
| 1,930,528 | Marthens | Oct. 17, 1944 |